United States Patent

Sulzer

(10) Patent No.: US 11,512,450 B2
(45) Date of Patent: Nov. 29, 2022

(54) TRACKED VEHICLE MOTION CORRECTION

(71) Applicant: Deere & Company, Moline, IL (US)

(72) Inventor: Bryan D. Sulzer, Dubuque, IA (US)

(73) Assignee: Deere & Company, Moline, IL (US)

(*) Notice: Subject to any disclaimer, the term of this patent is extended or adjusted under 35 U.S.C. 154(b) by 358 days.

(21) Appl. No.: 16/861,409

(22) Filed: Apr. 29, 2020

(65) Prior Publication Data

US 2021/0340729 A1 Nov. 4, 2021

(51) Int. Cl.
| | |
|---|---|
| E02F 9/22 | (2006.01) |
| B62D 55/06 | (2006.01) |
| G05D 1/00 | (2006.01) |
| E02F 9/02 | (2006.01) |
| B62D 55/10 | (2006.01) |
| E02F 3/32 | (2006.01) |

(52) U.S. Cl.
CPC .............. *E02F 9/225* (2013.01); *B62D 55/06* (2013.01); *B62D 55/10* (2013.01); *E02F 9/02* (2013.01); *G05D 1/0088* (2013.01); *E02F 3/32* (2013.01)

(58) Field of Classification Search
CPC . B62D 55/06; B62D 55/10; E02F 3/32; E02F 9/02; E02F 9/123; E02F 9/225; E02F 9/268; G05D 1/0088
See application file for complete search history.

(56) References Cited

U.S. PATENT DOCUMENTS

| | | | |
|---|---|---|---|
| 4,111,066 | A | 9/1978 | Kendrick |
| 6,477,914 | B1 | 11/2002 | Krieger |
| 7,477,973 | B2 | 1/2009 | Brewer et al. |
| 8,180,532 | B2 | 5/2012 | O'Halloran et al. |
| 8,190,334 | B2 * | 5/2012 | Kagoshima ........... E02F 9/2095 701/50 |

(Continued)

FOREIGN PATENT DOCUMENTS

| | | |
|---|---|---|
| CN | 103950471 A | 7/2014 |
| WO | 2008129345 A1 | 10/2008 |

OTHER PUBLICATIONS

German Search Report issued in application No. DE102021203140.4 dated Nov. 11, 2021 (06 pages).

*Primary Examiner* — Tyler J Lee
(74) *Attorney, Agent, or Firm* — Gary L. Montle; Lucian Wayne Beavers; Patterson Intellectual Property Law, PC (57) ABSTRACT

A working machine includes an undercarriage supported by first and second ground engaging units powered by first and second drive units, a main frame supported by the undercarriage, a first sensor configured to sense an orientation and relative angular motion of the main frame with respect to the undercarriage, a second sensor configured to sense an orientation and relative angular motion of the main frame in an external reference frame independent of the undercarriage, and a controller functionally linked to the first and second sensors. The controller is configured to receive commands corresponding to an intended movement of the first and second ground engaging units, and generate control signals to the first and second drive units to achieve or maintain the intended movement taking into account a detected orientation of the main frame relative to the undercarriage and a detected orientation of the main frame in the external reference frame.

11 Claims, 4 Drawing Sheets

(56) References Cited

U.S. PATENT DOCUMENTS

| | | |
|---|---|---|
| 10,519,626 B2 * | 12/2019 | Walenta ................ E02F 9/2217 |
| 2014/0168009 A1 | 6/2014 | Peake |
| 2019/0100205 A1 | 4/2019 | Kean et al. |
| 2019/0145082 A1 | 5/2019 | Walenta et al. |

* cited by examiner

TRACKED VEHICLE MOTION CORRECTION

FIELD OF THE DISCLOSURE

The present disclosure relates to self-propelled vehicles such as working machines having tracked ground engaging units, and more particularly systems and methods for controlling the tracked ground engaging units.

BACKGROUND

Working machines as discussed herein may for example include excavator machines, loaders, and other equipment which modify the terrain or equivalent working environment in some way. These machines may have tracked or wheeled ground engaging units supporting the undercarriage from the ground surface. Various situations arise with such machines where the human operator needs to precisely control the movements of the machine position using the machine's left-side and right-side crawler tracks.

For example, in the case of a tracked excavator machine, it is possible for one of the crawler tracks to move faster or slower than the other when the human operator is attempting to drive the machine in a straight line. Accordingly, while the machine may be receiving a straight-line input, it is ever so slightly turning left or right due to a mismatch between the track systems of the left-side and right-side crawler tracks.

Conventional solutions are generally inadequate for quickly adjusting and synchronizing the speed of the two tracks (i.e., their electro-hydraulic control). In order to address the problem, the machine would have to be removed from working service for adjustments to be made in order to address the problem, thus costing the machine owner time and money. Accordingly, when such a hydro-mechanical mismatch occurs on a job site, the human operator must be cognizant enough to recognize the mismatch and skilled enough to adjust his or her control inputs to counteract the mismatch.

SUMMARY OF THE DISCLOSURE

The current disclosure provides improvements in automatic control systems for controlling the electro-hydraulic control of the left-side and right-side crawler tracks, and more particularly to achieve and/or enable precise machine travel motion and direction control to overcome hydro-mechanical mismatching between left-side and right-side crawler track systems. Generally stated, the solutions offered herein do not rely on sensors residing entirely in or associated with an undercarriage of the working machine, at least in part due to potential communications issues between this area and the machine control system. The solutions offered herein accordingly utilize a rotation sensor measuring the orientation between a lower track frame and an upper structure, further in combination with a second sensor such as an angular rate gyroscope as part of an Inertial Measurement Unit (IMU) or as a stand-alone device placed above the rotary joint in a suitable location in the upper structure, to enable maintaining precise track differential control while simultaneously moving the upper structure relative to the lower track frame.

In one embodiment a self-propelled working machine comprises an undercarriage supported by first and second ground engaging units. A main frame is supported by the undercarriage. The self-propelled working machine further includes a first sensor which is configured to provide signals corresponding to an orientation and relative angular motion of the main frame with respect to the undercarriage, and a second sensor coupled in association with the main frame, and which is configured to provide signals corresponding to an orientation and relative angular motion of the main frame in an external reference frame independent of the undercarriage. The self-propelled working machine is further provided with means for driving the first and second ground engaging units according to an intended orientation and relative angular motion of the undercarriage in the external reference frame, responsive to the signals from the first and second sensors.

In one exemplary aspect of the above-referenced embodiment, first and second drive units are provided for driving the first and second ground engaging units, respectively.

In another exemplary aspect of the above-referenced embodiment, a controller is functionally linked to the first sensor and the second sensor, and is configured to receive commands corresponding to an intended movement of the first and second ground engaging units and generate control signals to the first and second drive units to achieve or maintain the intended movement of the first and second ground engaging units, further accounting for a detected orientation of the main frame relative to the undercarriage and a detected orientation of the main frame in the external reference frame independent of the undercarriage.

In another exemplary aspect of the above-referenced embodiment, optionally in combination with other of the aforementioned aspects, the controller may further be configured to determine an actual orientation and relative angular motion of the undercarriage in the external reference frame, based on the detected orientation of the main frame relative to the undercarriage and the detected orientation of the main frame in the external reference frame independent of the undercarriage. In accordance with this embodiment, the controller may further be configured to determine an error value corresponding to a difference between the actual orientation and relative angular motion of the undercarriage and an intended orientation and relative angular motion of the undercarriage, wherein the intended orientation and relative angular motion of the undercarriage corresponds to the intended movement of the first and second ground engaging units, and to generate the control signals to the first and second drive units based at least in part on the determined error value.

In another exemplary aspect of the above-referenced embodiment, optionally in combination with other of the aforementioned aspects, the second sensor may comprise an angular rate gyroscope. Alternatively, the second sensor may be integrated into an Inertial Measuring Unit (IMU).

In another exemplary aspect of the above-referenced embodiment, optionally in combination with other of the aforementioned aspects, the first and second drive units may comprise left-side and right-side drive units, respectively.

In another exemplary aspect of the above-referenced embodiment, optionally in combination with other of the aforementioned aspects, the first and second ground engaging units comprise left-side and right-side crawler tracks, respectively.

In further embodiments, the working machine may further comprise a swing bearing and a swing motor. The swing bearing may support the main frame from the undercarriage such that the main frame is pivotable about a pivot axis relative to the undercarriage. The pivot axis may be substantially vertical when a ground surface engaged by the ground engaging units is substantially horizontal. The swing motor may be configured to pivot the main frame on the swing bearing about the pivot axis relative to the undercarriage. In accordance with this embodiment, the controller may be configured to generate control signals to the swing motor to achieve or maintain a desired position of the main frame relative to the undercarriage.

In another exemplary embodiment as disclosed herein, a method is provided of controlling such a working machine. The method may include the steps of: (a) detecting an orientation and relative angular motion of the main frame relative to the undercarriage; (b) detecting an orientation and relative angular motion of the main frame in an external reference frame independent of the undercarriage; (c) receiving commands corresponding to an intended movement of the first and second ground engaging units; and (d) generate control signals to the first and second drive units to achieve or maintain the intended movement of the first and second ground engaging units, further accounting for a detected orientation of the main frame relative to the undercarriage and a detected orientation of the main frame in the external reference frame independent of the undercarriage.

In exemplary aspects of the above-referenced method, the method may further include: (e) determining an actual orientation and relative angular motion of the undercarriage in the external reference frame, based on the detected orientation of the main frame relative to the undercarriage and the detected orientation of the main frame in the external reference frame independent of the undercarriage; (f) determining an error value corresponding to a difference between the actual orientation and relative angular motion of the undercarriage and an intended orientation and relative angular motion of the undercarriage, wherein the intended orientation and relative angular motion of the undercarriage corresponds to the intended movement of the first and second ground engaging units; and (g) generating the control signals to the first and second drive units based at least in part on the determined error value.

In exemplary aspects of the above-referenced method, the orientation and relative angular motion of the main frame in the external reference frame independent of the undercarriage may be detected via an angular rate gyroscope.

In still further exemplary aspects of the above-referenced method, the orientation and relative angular motion of the main frame in the external reference frame independent of the undercarriage may be detected via an Inertial Measuring Unit (IMU).

In still further exemplary aspects of the above-referenced method, the method may further include pivoting the main frame on the swing bearing about the pivot axis relative to the undercarriage, to achieve or maintain a desired position of the main frame relative to the undercarriage.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-4, various embodiments of a working machine 100 may be described which preferably achieve precise machine travel motion and direction control to overcome hydro-mechanical mismatching between right and left ground engaging (e.g., tracked) units.

Figure 1:
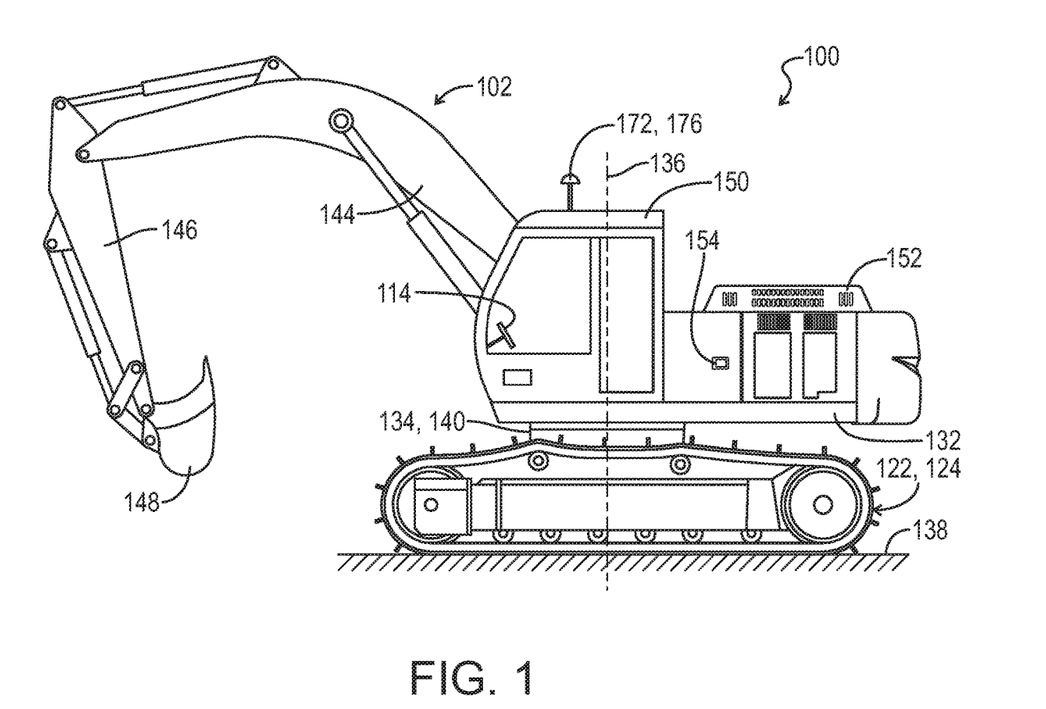
FIG. 1 is a side elevation view of a tracked excavator as a working machine as disclosed herein.
Figure 2:
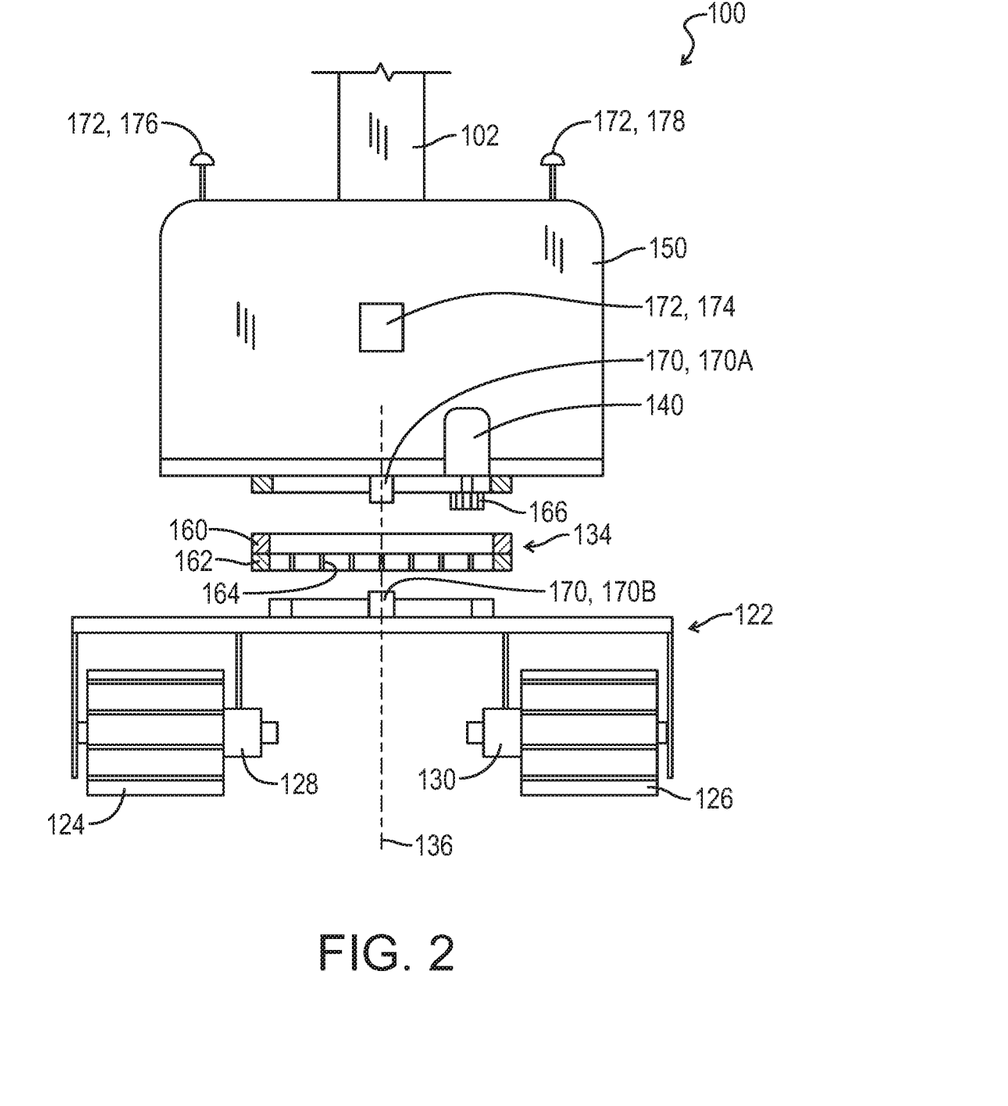
FIG. 2 is a schematic rear elevation exploded view of the tracked excavator machine of FIG. 1.

A representative working machine is shown and generally designated by the number 100, which in FIGS. 1-2 is a tracked excavator machine 100. The systems disclosed herein are applicable to similar or otherwise equivalent vehicles, excavator machines, loaders, and other working machines of the type having one or more working implements 102 for modifying the proximate terrain. In certain embodiments, systems and methods as disclosed herein may also be applicable to vehicles lacking explicit work implements. Work vehicles as discussed herein may typically have tracked ground engaging units supporting the undercarriage from the ground surface.

The working machine 100 is shown in a side elevation assembled view in FIG. 1, and in a rear elevation schematic partially exploded view in FIG. 2.

The illustrated and exemplary working machine 100 includes an undercarriage 122 including first and second ground engaging units 124 and 126. The first and second ground engaging units 124 and 126 may also be referred to herein as lift-side and right-side ground engaging units 124 and 126. The working machine 100 may further include first and second drive units 128 and 130 for driving the first and second ground engaging units 124 and 126, respectively. The first and second drive units 128 and 130 may also be referred to herein as left-side and right-side drive units 128 and 130 or first and second travel motors 128 and 130. Each of the tracked ground engaging units 124, 126 may typically include a front idler, a drive sprocket, and a track chain extending around the front idler and the drive sprocket. The travel motor 128, 130 of each tracked ground engaging unit 124, 126 drives its respective drive sprocket. Each tracked ground engaging unit 124, 126 has a forward traveling direction defined from the drive sprocket toward the front idler. The forward traveling direction of the tracked ground engaging units 124, 126 also defines a forward traveling direction of the undercarriage 122 and thus of the working machine 100.

A main frame 132 is supported by the undercarriage 122. In certain optional embodiments, the main frame 132 may be supported by the undercarriage 122 via a swing bearing 134 such that the main frame 132 is pivotable about a pivot axis 136 relative to the undercarriage. The pivot axis 136 is substantially vertical when a ground surface 138 engaged by the first and second ground engaging units 124 and 126 is substantially horizontal. A swing motor 140 is configured to pivot the main frame 132 on the swing bearing 134 about the pivot axis 136 relative to the undercarriage 122.

A working machine as disclosed herein typically includes one or more working implements 102 which as illustrated for example in FIG. 1 may collectively define a boom assembly including a boom 144, an arm 146 pivotally connected to the boom 144, and a working tool 148. The boom 144 in the present example is pivotally attached to the main frame 132 to pivot about a generally horizontal axis relative to the main frame 132. The working tool in this embodiment is an excavator shovel or bucket 148 which is pivotally connected to the arm 146. The boom assembly extends from the main frame 132 along a working direction of the boom assembly. The working direction can also be described as a working direction of the boom.

An operator's cab 150 may be located on the main frame 132. The operator's cab and the one or more working implements 102 may both be mounted on the main frame so that the operator's cab faces in the working direction of the working implements. A control station including a user interface 114 may be located in the operator's cab 150.

Also mounted on the main frame 132 is an engine 152 for powering the working machine 100. The engine 152 may be a diesel internal combustion engine. The engine 152 may drive a hydraulic pump 154 to provide hydraulic power to the various operating systems of the working machine 100. The engine 152, the hydraulic pump 154 and the related hydraulic power system for the working machine 100 may be configured to provide power to the first and second drive units 128 and 130.

The swing bearing 134 as schematically shown in FIG. 2 includes an upper ring 160 configured to be bolted to the underside of the main frame 132, and a lower ring 162 configured to be bolted to the undercarriage 122. The lower ring 162 includes an internally toothed ring gear 164. The swing motor 140 is mounted on the main frame 132 and drives a pinion gear 166 which extends downward into engagement with the internally toothed ring gear 164. Operation of the swing motor 140 drives the pinion gear 166 which results in pivoting movement of the main frame 132 on the swing bearing 134 about the pivot axis 136 relative to the undercarriage 122.

The working machine 100 includes a first sensor 170 and a second sensor 172. The first sensor 170 is configured to provide signals 170S (see FIG. 3) corresponding to an orientation and relative angular motion of the main frame 132 with respect to the undercarriage 122. The second sensor 172 is coupled in association with the main frame 132 and is configured to provide signals 172S (see FIG. 3) corresponding to an orientation and relative angular motion of the main frame 132 in an external reference frame (e.g., with respect to the ground surface 138, or a like such independent external reference frame) independent of the undercarriage 122. The benefit of coupling the second sensor 172 to the main frame 132, is that wiring and/or signals need not pass through the swing bearing 134 for coupling to a controller located in the cab 150 or coupled to the main frame 132.

As schematically illustrated in FIG. 2, the first sensor 170 may include an upper sensor part 170A mounted on the main frame 132 and a lower sensor part 170B mounted on the undercarriage 122. In certain optional embodiments, the first sensor 170 may be a pivot angle sensor or a Hall Effect rotational sensor. Such a Hall Effect rotational sensor may include a Hall element, a rotating shaft and a magnet. When the angular position of the Hall element changes, the corresponding changes in the magnetic field results in a linear change in output voltage. Other suitable types of rotary position sensors include rotary potentiometers, resolvers, optical encoders, inductive sensors and the like. Additionally, in certain optional embodiments, the first sensor 170 may be entirely mounted to the main frame 132, entirely mounted to the undercarriage 122, or include multiple parts each mounted to one of the main frame 132 or the undercarriage 122.

The second sensor 172 may comprise an angular rate gyroscope, such as, for example, a three-axis gyroscopic unit, or the like. In certain optional embodiments, the second sensor 172 may include or be incorporated into an inertial measurement unit (IMU) 174 mounted on the main frame 132 or the cab 150. In certain other optional embodiments, second sensor 172 may include a plurality of GPS sensing units 176, 178 fixed relative to the main frame 132 and the cab 150. Such GPS sensing units can detect the absolute position and orientation of the working machine 100 within an external reference system (e.g., an external reference frame), and can detect changes in such position and orientation.

Figure 3:
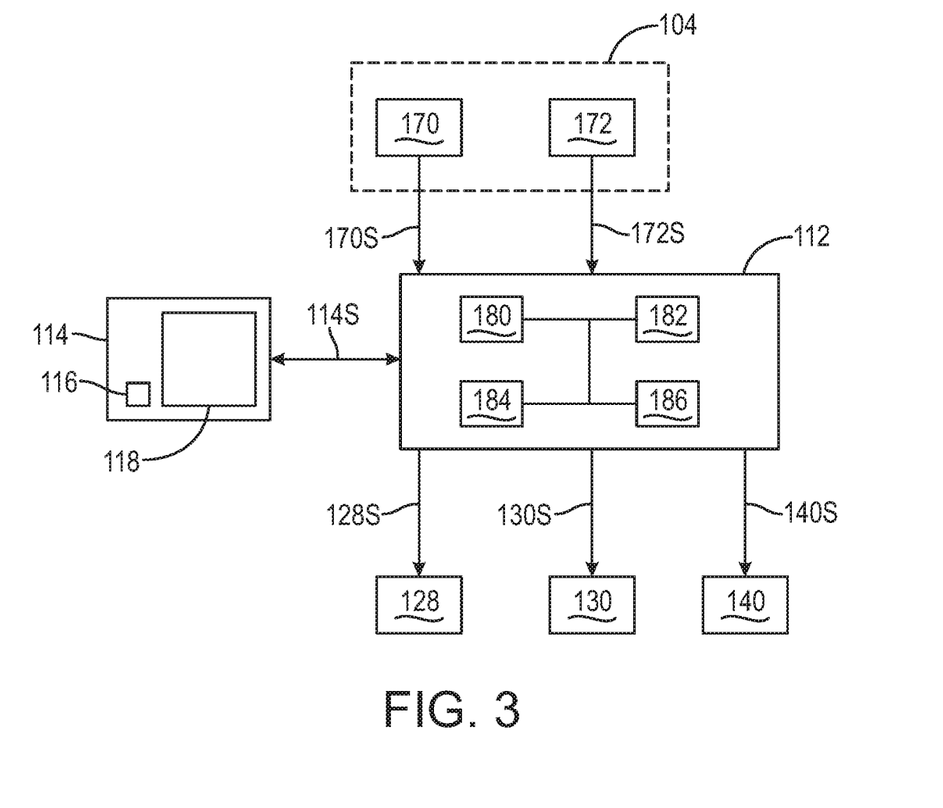
FIG. 3 is a block diagram representing an exemplary control system for the working machine of FIG. 1.

As schematically illustrated in FIG. 3, the working machine 100 includes a control system including a controller 112. The controller 112 may be part of the machine control system of the working machine, or it may be a separate control module. The controller 112 may include the user interface 114 and optionally be mounted in the operators cab at a control panel.

The controller 112 is configured to receive input signals from some or all of various sensors collectively defining a sensor system 104. The sensor system 104 includes at least the first and second sensors 170 and 172. Certain other sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

The controller 112 is functionally linked to the first and second sensors 170 and 172. The controller 112 is configured to receive command signals 114S from the user interface 114 corresponding to an intended movement of the first and second ground engaging units 124 and 126. The controller 112 is further configured to generate control signals 128S and 130S to the first and second drive units 128 and 130, respectively, to achieve or maintain the intended movement of the first and second ground engaging units 124 and 126. The control signals 128S and 130S generated by the controller 112 may further account for a detected orientation of the main frame 132 relative to the undercarriage 122 and a detected orientation of the main frame 132 in the external reference frame independent of the undercarriage 122.

In certain optional embodiments, the controller 112 may further be configurated to determine an actual orientation and relative angular motion of the undercarriage 122 in the external reference frame based on the detected orientation of the main frame 132 relative to the undercarriage 122 and the detected orientation of the main frame 132 relative to the external reference frame independent of the undercarriage 122. The controller 112 may further be configurated to determine an error value corresponding to a difference between the actual orientation and relative angular motion of the undercarriage 122 and an intended orientation and relative angular motion of the undercarriage 122. The intended orientation and relative angular motion of the undercarriage 122 corresponds to the intended movement (e.g., based on the command signals 114S from the user interface 114) of the first and second ground engaging units 124 and 126. Finally, the controller 112 may further be configured to generate the control signals 128S and 130S to the first and second drive units 128 and 130, respectively, based at least in part of the determined error value.

In certain other optional embodiments, the controller 112 may be configured to generate control signals 140S to the swing motor 140 to achieve or maintain a desired position of the main frame 132 relative to the undercarriage 122. The designed positioned may be sensed by the first sensor 170 in such an embodiment.

The controller 112 includes or may be associated with a processor 180, a computer readable medium 182, a communication unit 184, data storage 186 such as for example a database network, and the aforementioned user interface 114 or control panel 114 having a display 118. An input/output device 116, such as a keyboard, joystick or other user interface tool, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by the processor 180, or in a combination of the two. The computer program product can reside in RAM memory, flash memory, ROM memory, EPROM memory, EEPROM memory, registers, hard disk, a removable disk, or any other form of computer readable medium 182 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 184 may support or provide communications between the controller and external systems or devices, and/or support or provide communication interface with respect to internal components of the working machine. The communications unit may include wireless communication system components (e.g., via cellular modem, WiFi, Bluetooth or the like) and/or may include one or more wired communications terminals such as universal serial bus ports.

Data storage 186 as discussed herein may, unless otherwise stated, generally encompass hardware such as volatile or non-volatile storage devices, drives, memory, or other storage media, as well as one or more databases residing thereon.

Referring generally to FIGS. 1-3, the working machine 100 includes systems, methods, and apparatuses for overcoming hydro-mechanical mismatching between the first and second drive units 128 and 130. Using the second sensor 172 as part of an IMU 174 or as a stand-alone device coupled with the electro-hydraulic control of the first and second ground engaging units 124 and 126 of the working machine 100 precise machine travel motion and direction control can be achieved to overcome hydro-mechanical mismatching between the first and second drive units 128 and 130. With the addition of the first sensor 170 measuring the orientation between the undercarriage 122 and the main frame 132, the second sensor 172 can be placed above the swing bearing 134 in a suitable location in the main frame 132 to enable maintaining precise track differential control while simultaneously moving the main frame 132 relative to the undercarriage 122 and the undercarriage 122 relative to the ground surface 138.

Figure 4:
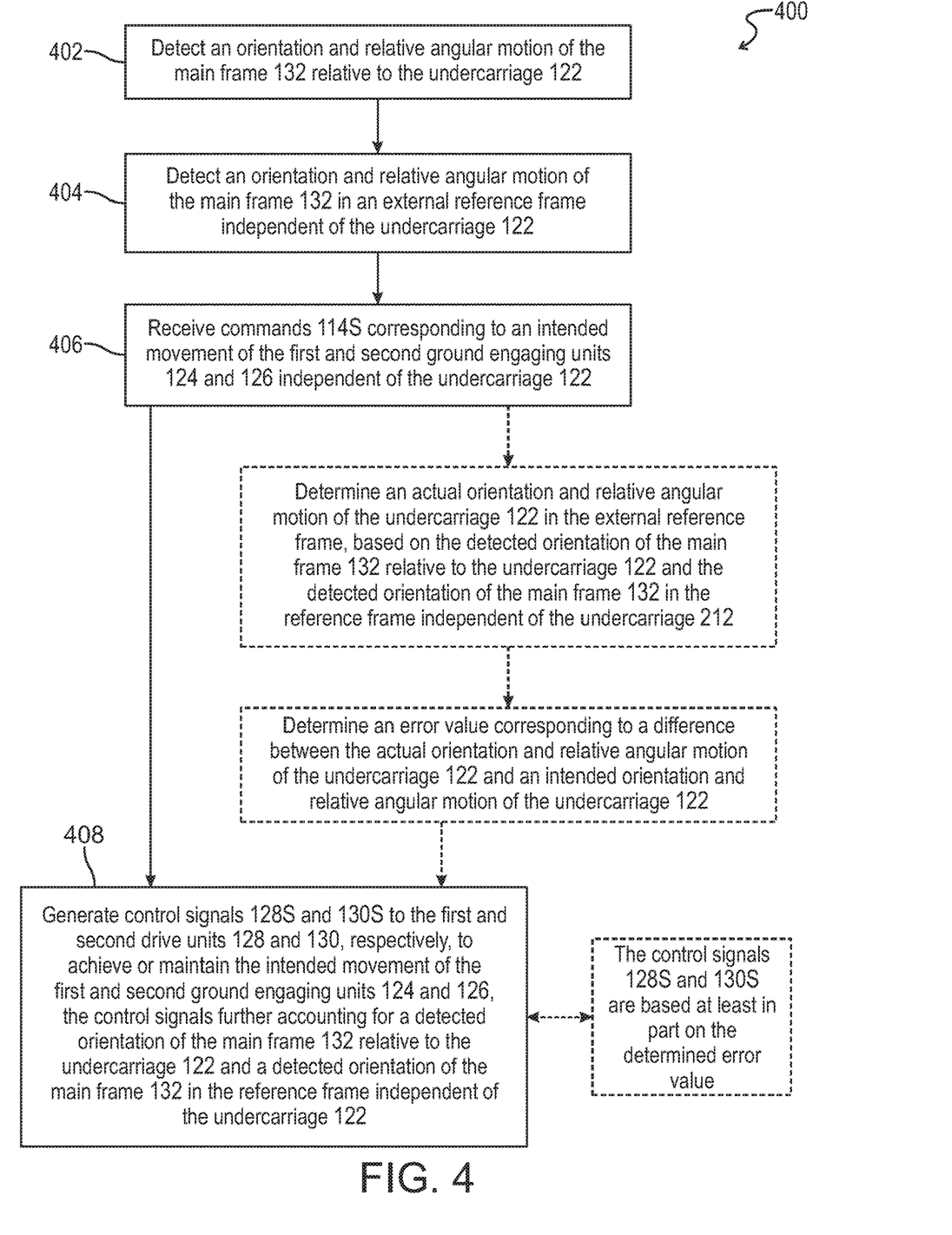
FIG. 4 is a flowchart representing an exemplary embodiment of a method as disclosed herein.

FIG. 4 represents an exemplary embodiment of a method of operation 400 as disclosed herein. Unless otherwise expressly noted, various steps of the method may be performed at the level of a local working machine controller, at the level of a computing device associated with an operator of a working machine or other user, and/or at the level of one or more remote servers communicatively linked thereto.

The method 400 may begin in step 402 with the detection of an orientation and relative angular motion of the main frame 132 relative to the undercarriage 122. The method 400 may continue in step 404 by detecting an orientation and relative angular motion of the main frame 132 in an external reference frame independent of the undercarriage 122 (e.g., with respect to the ground). The method 400 may continue in step 406 by receiving commands 114S corresponding to an intended movement of the first and second ground engaging units 124 and 126. The received commands may be from the user interface 114.

The method 400 may continue in step 408 by generating control signals 128S and 130S to the first and second drive units 128 and 130, respectively, to achieve or maintain the intended movement of the first and second ground engaging units 124 and 126, the control signals further accounting for a detected orientation of the main frame 132 relative to the undercarriage 122 and a detected orientation of the main frame 132 in the external reference frame independent of the undercarriage 122. For example, if the commands 114S indicate that the machine 100 is to proceed in a substantially forward direction, with the first and second ground engaging units 124 and 126 intended to be maintained in a parallel orientation, the controller may detect rotation of the main frame relative to the undercarriage, and ascertain whether the further detected orientation of the main frame in the external reference system is consistent with the desired forward direction. If not, control signals 128S and 130S may be generated to correct for any errors which account for the detected amount of mismatch.

In certain optional embodiments the method 400 may include, between steps 406 and 408, determining an actual orientation and relative angular motion of the undercarriage 122 in the external reference frame, based on the detected orientation of the main frame 132 relative to the undercarriage 122 and the detected orientation of the main frame 132 in the external reference frame independent of the undercarriage 122, and determining an error value corresponding to a difference between the actual orientation and relative angular motion of the undercarriage 122 and an intended orientation and relative angular motion of the undercarriage 122, wherein the intended orientation and relative angular motion of the undercarriage 122 corresponds to the intended movement of the first and second ground engaging units 124 and 126. In accordance with these optional embodiments, the control signals to the first and second drive units 128 and 130 generated in step 408 are based at least in part on the determined error value.

In one exemplary such optional embodiment, the controller may dynamically establish target values for an effective or virtual sensor (or group of sensors) in the undercarriage, and further generate effective or virtual sensor output values based on the actual detected values for the orientation and relative angular motion of the main frame 132 relative to the undercarriage 122, and the orientation and relative angular motion of the main frame 132 in the external reference frame independent of the undercarriage. Error values may be generated based on discrepancies between the target and "actual" values determined in accordance with the effective or virtual undercarriage sensor(s).

The method 400 may further include pivoting the main frame 132 on the swing bearing about the pivot axis 136 relative to the undercarriage 122, to achieve or maintain a desired position of the main frame 132 relative to the undercarriage 122.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may readily appreciate that the apparatus and methods of the present disclosure achieve certain ends and advantages as explicitly mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled working machine, comprising:
   an undercarriage supported by first and second ground engaging units;
   first and second drive units for driving the first and second ground engaging units, respectively;
   a main frame supported by the undercarriage;
   a first sensor configured to provide signals corresponding to an orientation and relative angular motion of the main frame with respect to the undercarriage;
   a second sensor coupled in association with the main frame, and configured to provide signals corresponding to an orientation and relative angular motion of the main frame in an external reference frame independent of the undercarriage; and
   a controller functionally linked to the first sensor and the second sensor, and configured to
      receive commands corresponding to an intended movement of the first and second ground engaging units,
      determine an actual orientation and relative angular motion of the undercarriage in the external reference frame, based on a detected orientation of the main frame relative to the undercarriage and a detected orientation of the main frame in the external reference frame independent of the undercarriage,
      determine an error value corresponding to a difference between the actual orientation and relative angular motion of the undercarriage and an intended orientation and relative angular motion of the undercarriage, wherein the intended orientation and relative angular motion of the undercarriage corresponds to the intended movement of the first and second ground engaging units, and
      generate control signals to the first and second drive units to achieve or maintain the intended movement of the first and second ground engaging units, based at least in part on the determined error value.

2. The working machine of claim 1, wherein the second sensor comprises an angular rate gyroscope.

3. The working machine of claim 1, wherein the second sensor is integrated into an Inertial Measuring Unit (IMU).

4. The working machine of claim 1, wherein the first and second drive units comprise left-side and right-side drive units, respectively.

5. The working machine of claim 4, wherein the first and second ground engaging units comprise left-side and right-side crawler tracks, respectively.

6. The working machine of claim 1, further comprising:
   a swing bearing supporting the main frame from the undercarriage such that the main frame is pivotable about a pivot axis relative to the undercarriage, the pivot axis being substantially vertical when a ground surface engaged by the ground engaging units is substantially horizontal; and
   a swing motor configured to pivot the main frame on the swing bearing about the pivot axis relative to the undercarriage.

7. The working machine of claim 6, wherein the controller is configured to generate control signals to the swing motor to achieve or maintain a desired position of the main frame relative to the undercarriage.

8. A method of controlling a working machine, the working machine including an undercarriage supported by first and second ground engaging units, first and second drive units for driving the first and second ground engaging units, respectively, and a main frame supported by the undercarriage, the method comprising:
   detecting an orientation and relative angular motion of the main frame relative to the undercarriage;
   detecting an orientation and relative angular motion of the main frame in an external reference frame independent of the undercarriage;
   receiving commands corresponding to an intended movement of the first and second ground engaging units;
   determining an actual orientation and relative angular motion of the undercarriage in the external reference frame, based on the detected orientation of the main frame relative to the undercarriage and the detected orientation of the main frame in the external reference frame independent of the undercarriage;
   determining an error value corresponding to a difference between the actual orientation and relative angular motion of the undercarriage and an intended orientation and relative angular motion of the undercarriage, wherein the intended orientation and relative angular motion of the undercarriage corresponds to the intended movement of the first and second ground engaging units; and
   generating control signals to the first and second drive units to achieve or maintain the intended movement of the first and second ground engaging units, based at least in part on the determined error value.

9. The method of claim 8, wherein the orientation and relative angular motion of the main frame in the external reference frame independent of the undercarriage is detected via an angular rate gyroscope.

10. The method of claim 8, wherein the orientation and relative angular motion of the main frame in the external reference frame independent of the undercarriage is detected via an Inertial Measuring Unit (IMU).

11. The method of claim 8, wherein the working machine further comprises a swing bearing supporting the main frame from the undercarriage such that the main frame is pivotable about a pivot axis relative to the undercarriage, the pivot axis being substantially vertical when a ground surface engaged by the ground engaging units is substantially horizontal, the method further comprising:

pivoting the main frame on the swing bearing about the pivot axis relative to the undercarriage, to achieve or maintain a desired position of the main frame relative to the undercarriage.

\* \* \* \* \*